(12) United States Patent
Wu

(10) Patent No.: US 10,292,080 B2
(45) Date of Patent: May 14, 2019

(54) DEVICE AND METHOD OF AGGREGATING WLAN AND LTE SYSTEM

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 5 days.

(21) Appl. No.: 15/170,938

(22) Filed: Jun. 1, 2016

(65) Prior Publication Data

US 2016/0366629 A1 Dec. 15, 2016

Related U.S. Application Data

(60) Provisional application No. 62/173,381, filed on Jun. 10, 2015.

(51) Int. Cl.
| | |
|---|---|
| *H04W 28/08* | (2009.01) |
| *H04W 36/16* | (2009.01) |
| *H04W 4/38* | (2018.01) |
| *H04W 76/30* | (2018.01) |
| *H04W 76/25* | (2018.01) |
| *H04W 92/08* | (2009.01) |
| *H04W 84/12* | (2009.01) |

(52) U.S. Cl.
CPC ........... *H04W 36/165* (2013.01); *H04W 4/38* (2018.02); *H04W 28/08* (2013.01); *H04W 76/25* (2018.02); *H04W 76/30* (2018.02); *H04W 84/12* (2013.01); *H04W 92/08* (2013.01)

(58) Field of Classification Search
CPC . H04W 4/006; H04W 36/165; H04W 76/045; H04W 76/06; H04W 84/12; H04W 28/08; H04W 92/08
See application file for complete search history.

(56) References Cited

U.S. PATENT DOCUMENTS

| | | | |
|---|---|---|---|
| 2013/0242897 A1* | 9/2013 | Meylan | H04W 28/16 370/329 |
| 2016/0219475 A1* | 7/2016 | Kim | H04W 76/025 |

(Continued)

OTHER PUBLICATIONS

LG Electronics Inc., May 25-29, 2015, 3GPP TSG-RAN # 90, R2-152730, pp. 1-3.*

(Continued)

*Primary Examiner* — Lakeram Jangbahadur
(74) *Attorney, Agent, or Firm* — Winston Hsu

(57) ABSTRACT

A communication device for aggregating long term evolution (LTE) and wireless local area network (WLAN) comprises a storage unit for storing instructions and a processing means coupled to the storage unit. The processing means is configured to execute the instructions stored in the storage unit. The instructions comprise transmitting a first message indicating support of LTE-WLAN aggregation to a base station (BS) via a LTE communication; receiving a configuration message configuring reception of at least one LTE packet transmitted via a WLAN and a WLAN configuration from the BS via the LTE communication; receiving the at least one LTE packet from the BS via the WLAN in response to the configuration message; and not showing an identification of the WLAN configured by the WLAN configuration on a display of the communication device.

3 Claims, 5 Drawing Sheets

(56) References Cited

U.S. PATENT DOCUMENTS

2017/0215122 A1* 7/2017 Nigam ............... H04W 12/08
2017/0265241 A1* 9/2017 Fujishiro ............ H04W 16/14

OTHER PUBLICATIONS

Intel Corporation, Sep. 13-16, 2011, 3GPP TSG-RAN #53, RP-111094, pp. 1-4.*
Search Report dated Nov. 3, 2016 for EP application No. 16172409.1, pp. 1-9.
Intel Corporation, "Discussions on Carrier Aggregation across LTE and WiFi", 3GPP TSG-RAN meeting #53, RP-111094, Sep. 13-16, 2011, Fukuoka, Japan, XP002725489, pp. 1-4.
LG Electronics Inc., "Considerations on LTE/WLAN aggregation", 3GPP TSG-RAN WG2 #90, R2-152730, May 25-29, 2015, Fukuoka, Japan, XP050974028, pp. 1-3.
LG Electronics Inc., "WLAN measurement for LTE/WLAN aggregation and interworking enhancements", 3GPP TSG-RAN WG2 #90, R2-152733, May 25-29, 2015, Fukuoka, Japan, XP050973999, pp. 1-3.
Intel Corporation, Qualcomm Incorporated, KT Corp, CMCC, KDDI, "User Plane Architecture Aspects of LTE/WLAN aggregation", 3GPP TSG-RAN2 Meeting #89bis, R2-151193, Apr. 20-24, 2015, Bratislava, Slovakia, XP050936162, pp. 1-5.
3GPP TS 36.300 V12.5.0 (Mar. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).
3GPP TS 36.321 V12.5.0 (Mar. 2015) Technical Specification 3rd Generation Partnership Project; Technical Specification Group Radio Access Network; Evolved Universal Terrestrial Radio Access (E-UTRA); Medium Access Control (MAC) protocol specification (Release 12).
3GPP TS 36.331 V12.5.0 (Mar. 2015) Technical Specification 3rd Generation Partnership Project; Technical Specification Group Radio Access Network; Evolved Universal Terrestrial Radio Access (E-UTRA); Radio Resource Control (RRC); Protocol specification (Release 12).
3GPP TS 36.323 V12.3.0 (Mar. 2015) Technical Specification 3rd Generation Partnership Project; Technical Specification Group Radio Access Network; Evolved Universal Terrestrial Radio Access (E-UTRA); Packet Data Convergence Protocol (PDCP) specification (Release 12).

* cited by examiner

DEVICE AND METHOD OF AGGREGATING WLAN AND LTE SYSTEM

CROSS REFERENCE TO RELATED APPLICATIONS

This application claims the benefit of U.S. Provisional Application No. 62/173,381, filed on Jun. 10, 2015, which is incorporated herein by reference.

BACKGROUND OF THE INVENTION

1. Field of the Invention

The present invention relates to a device and a method used in a wireless communication system, and more particularly, to a device and a method of aggregating a wireless local area network (WLAN) and a long term evolution (LTE) system.

2. Description of the Prior Art

A long-term evolution (LTE) system provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system is an evolution of the LTE system. The LTE-A system extends cell coverage of an eNB, increases peak data rate and throughput, and includes advanced techniques, such as carrier aggregation (CA), licensed-assisted access (LAA) using LTE, etc.

The LTE system may be aggregated with a wireless local area network (WLAN) to improve throughput of the LTE system. That is, the eNB transmits/receives data via both LTE communication and WLAN communication to/from the UE.

In one example, the UE may disconnect a WLAN configured by the eNB, while the eNB does not know that the UE has disconnected the WLAN. The eNB keeps transmitting LTE packets to the UE via the WLAN, and resources for transmitting the LTE packets are wasted. In another example, the UE has connected to a WLAN according to a user's selection or a selection algorithm. After a while, the UE may receive a message configuring the UE to connect to another WLAN. It is unknown how the UE should operate when this conflict occurs.

Thus, how to aggregating the WLAN and the LTE system when the above problem occurs is an important problem to be solved.

SUMMARY OF THE INVENTION

The present invention therefore provides a communication device and method for aggregating a WLAN and a LTE system to solve the abovementioned problem.

A communication device for aggregating long term evolution (LTE) and wireless local area network (WLAN) comprises a storage unit for storing instructions and a processing means coupled to the storage unit. The processing means is configured to execute the instructions stored in the storage unit. The instructions comprise transmitting a first message indicating support of LTE-WLAN aggregation to a base station (BS) via a LTE communication; receiving a configuration message configuring reception of at least one LTE packet transmitted via a WLAN and a WLAN configuration from the BS via the LTE communication; receiving the at least one LTE packet from the BS via the WLAN in response to the configuration message; and not showing an identification of the WLAN configured by the WLAN configuration on a display of the communication device.

A communication device for aggregating long term evolution (LTE) and wireless local area network (WLAN) comprises a storage unit for storing instructions and a processing means coupled to the storage unit. The processing means is configured to execute the instructions stored in the storage unit. The instructions comprise transmitting a first message indicating support of LTE-WLAN aggregation to a base station (BS) via a LTE communication; receiving a configuration message configuring reception of at least one LTE packet transmitted via a WLAN and a WLAN configuration from the BS via the LTE communication; receiving the at least one LTE packet from the BS via the WLAN in response to the configuration message; showing an identification of the WLAN configured by the WLAN configuration in a user interface on a display of the communication device; and disabling a WLAN disconnection function for the identification in the user interface.

A communication device for aggregating a long term evolution (LTE) and wireless local area network (WLAN) comprises a storage unit for storing instructions and a processing means coupled to the storage unit. The processing means is configured to execute the instructions stored in the storage unit. The instructions comprise transmitting a first message indicating support of LTE-WLAN aggregation to a base station (BS) via a LTE communication; receiving a configuration message configuring reception of at least one LTE packet transmitted via a first WLAN and a WLAN configuration from the BS via the LTE communication, when the communication device connects to a second WLAN selected by an operating system of the communication device; connecting to the first WLAN configured by the WLAN configuration; and receiving the at least one LTE packet via the first WLAN configured by the WLAN configuration.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
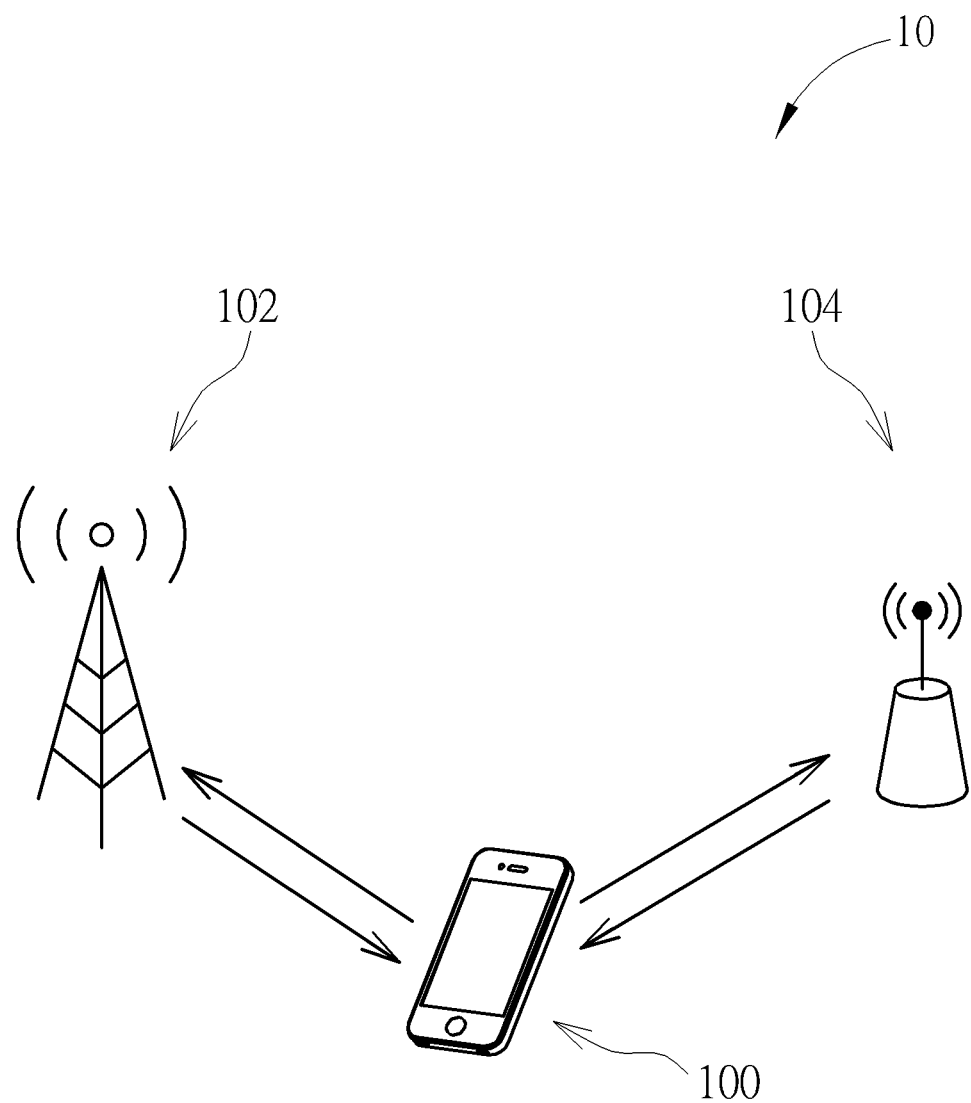
FIG. 1 is a schematic diagram of a wireless communication system according to an example of the present invention.

FIG. 1 is a schematic diagram of a wireless communication system 10 according to an example of the present invention. The wireless communication system 10 is briefly composed of a user equipment (UE) 100, a base stations (BS) 102 and an access point (AP) 104. In FIG. 1, the UE 100, the BS 102 and the AP 104 and are simply utilized for illustrating the structure of the wireless communication system 10. Practically, the BS 102 may be an evolved Node-B (eNB) in an evolved universal terrestrial radio access network (E-UTRAN), a long term evolution (LTE) system, a LTE-Advanced (LTE-A) system, an evolution of the LTE-A system, or a fifth generation (5G) system employing orthogonal frequency-division multiplexing (OFDM) and/or non-OFDM and a transmission time interval (TTI) shorter than 1 millisecond (e.g., 100 or 200 microseconds). The AP 104 maybe operated according to Institute of Electrical and Electronics Engineers (IEEE) 802.11 standard(s), such as IEEE 802.11a, IEEE 802.11n, IEEE 802.11ac and/or IEEE 802.11ax. Note that the BS 102 and AP 104 may be collocated or non-collocated.

As shown in FIG. 1, the UE 100 may be configured to communicate with the BS 102 and/or the AP 104. That is, the UE 100 may perform a transmission/reception via the BS 102 and/or the AP 104. For example, the UE 100 may transmit and/or receive packets (e.g., protocol data units (PDUs)) to and/or from the BS 102. Similarly, the UE 100 may transmit and/or receive packets (e.g., PDUs or internet protocol (IP) packets) to and/or from the AP 104.

The UE 100 maybe a mobile phone, a laptop, a tablet computer, an electronic book, a portable computer system, a vehicle, or an aircraft. For uplink, the UE 100 is the transmitter and the BS 102 and/or the AP 104 is the receiver, and for downlink, the BS 102 and/or the AP 104 is the transmitter and the UE 100 is the receiver.

Figure 2:
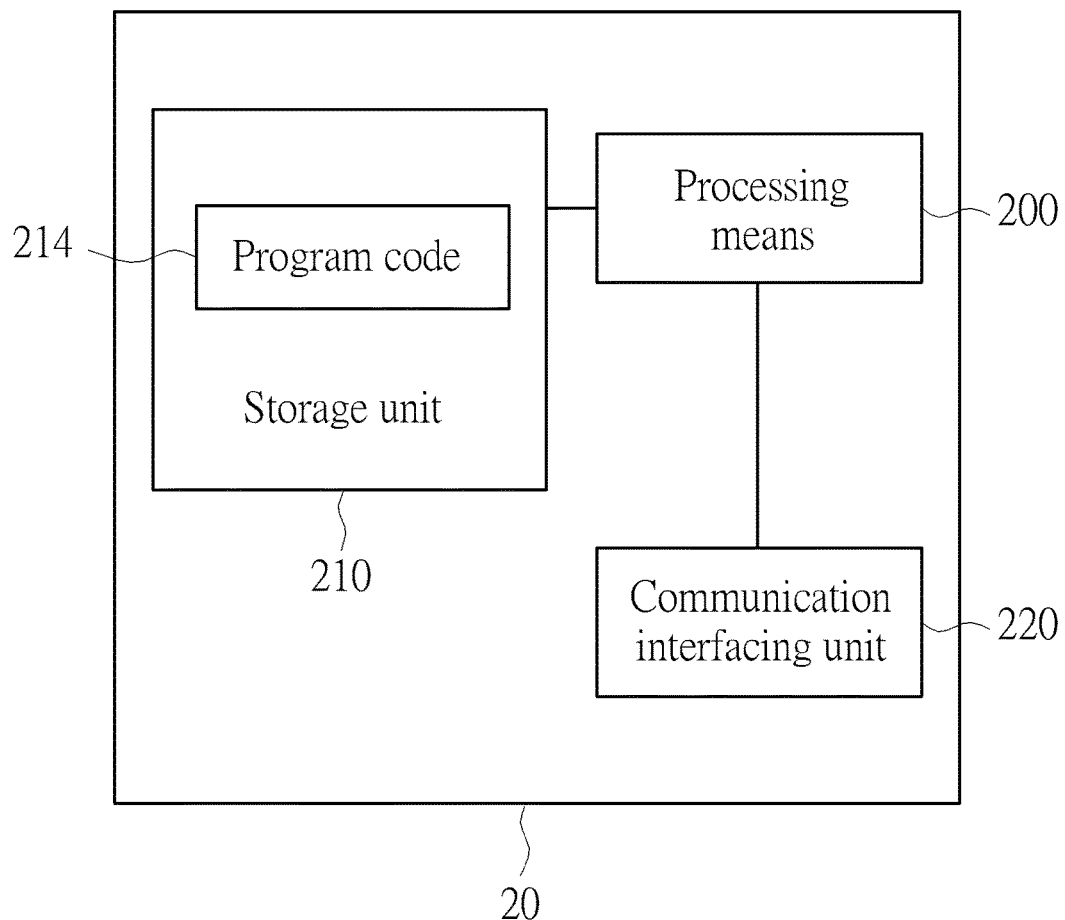
FIG. 2 is a schematic diagram of a communication device according to an example of the present invention.

FIG. 2 is a schematic diagram of a communication device 20 according to an example of the present invention. The communication device 20 may be the UE 100, the BS 102 and/or the AP 104 shown in FIG. 1, but is not limited herein. The communication device 20 includes a processing means 200 such as a microprocessor or Application Specific Integrated Circuit, a storage unit 210 and a communication interfacing unit 220. The storage unit 210 may be any data storage device that stores a program code 214, accessed and executed by the processing means 200. Examples of the storage unit 210 include but are not limited to read-only memory, flash memory, random-access memory, hard disk, optical data storage device, non-volatile storage unit, non-transitory computer-readable medium (e.g., tangible media), etc. The communication interfacing unit 220 is preferably a transceiver used to transmit and receive signals (e.g., data, signals, messages and/or packets) according to processing results of the processing means 200.

Figure 3:
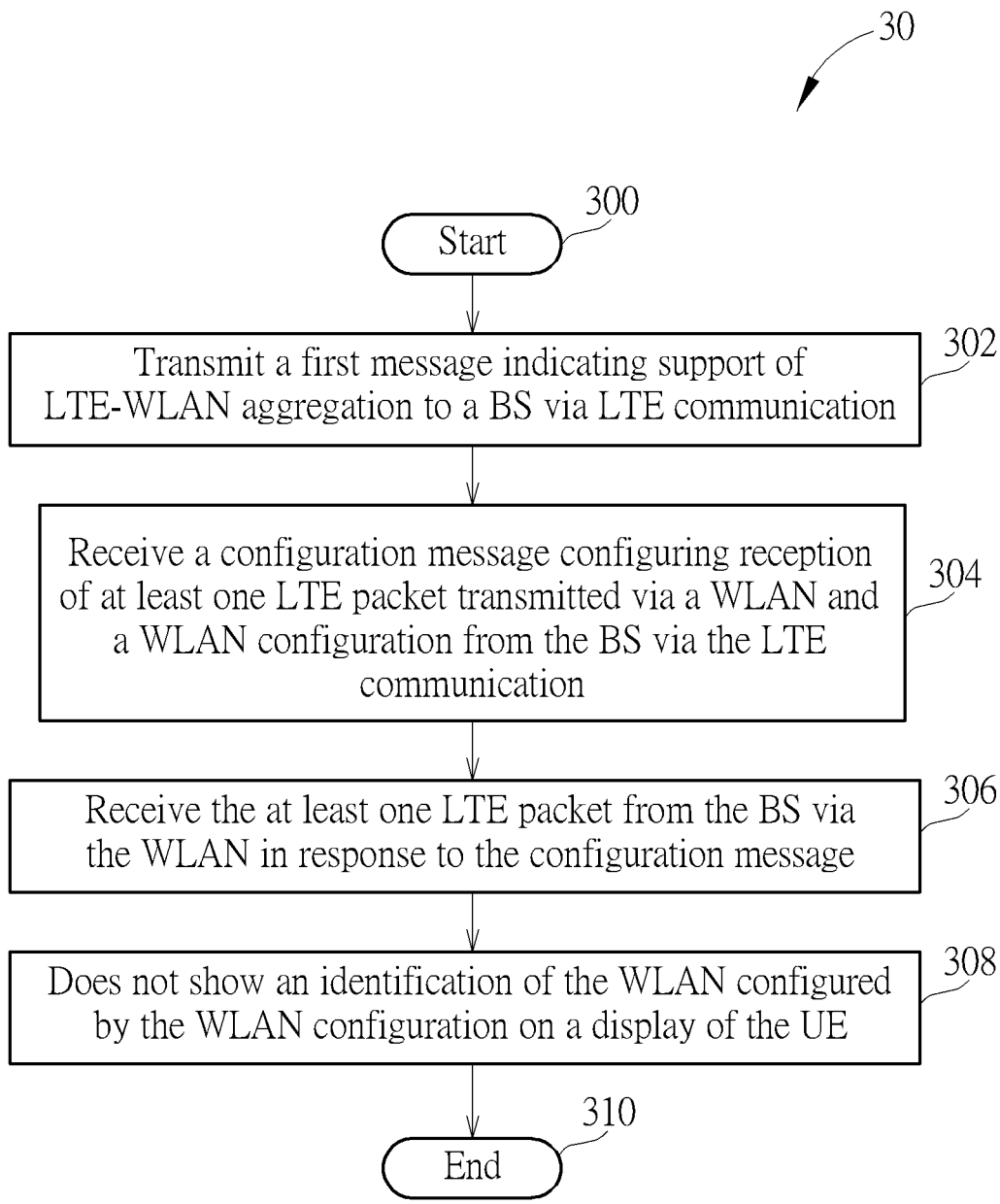
FIG. 3 is a flowchart of a process according to an example of the present invention.

FIG. 3 is a flowchart of a process 30 according to an example of the present invention. The process 30 maybe utilized in a UE (e.g., the UE 100), for aggregating LTE and wireless local area network (WLAN) (e.g., WiFi). The process 30 may be compiled into the program code 214 and includes the following steps:

Step 300: Start.

Step 302: Transmit a first message indicating support of LTE-WLAN aggregation to a BS via LTE communication.

Step 304: Receive a configuration message configuring reception of at least one LTE packet transmitted via a WLAN and a WLAN configuration from the BS via the LTE communication.

Step 306: Receive the at least one LTE packet from the BS via the WLAN in response to the configuration message.

Step 308: Does not show an identification of the WLAN configured by the WLAN configuration on a display of the UE.

Step 310: End.

According to the process 30, the UE may transmit a first message indicating support of LTE-WLAN aggregation to a BS (e.g., the BS 102) via LTE communication. Accordingly, the UE may receive a configuration message (e.g., RRCConnectionReconfiguration) configuring a reception of at least one LTE packet transmitted via a WLAN and a WLAN configuration from the BS via the LTE communication. The UE may receive the at least one LTE packet from the BS via the WLAN in response to the configuration message. In this situation, the UE does not show an identification of the WLAN configured by the WLAN configuration on a display of the UE. That is, the identification is not shown on the display, to prevent a user of the UE from selecting the identification to disconnect the WLAN. Thus, the WLAN is not disconnected according to the user's decision. As a result, the situation that the BS continues transmitting LTE packet(s) to the UE via the WLAN disconnected by the UE is avoided, and resources for transmitting the LTE packet(s) are saved.

Realization of the process 30 is not limited to the above description.

In one example, the identification may include a service set identifier (SSID) of the WLAN, a basic service set identifier (BSSID) of the WLAN, and/or a homogenous extended service set identifier (HESSID) of the WLAN, for the UE to identify the WLAN. In one example, the at least one LTE packet may include at least one LTE packet data convergence protocol (PDCP) protocol data unit (PDU) or at least one LTE PDCP service data unit (SDU).

Figure 4:
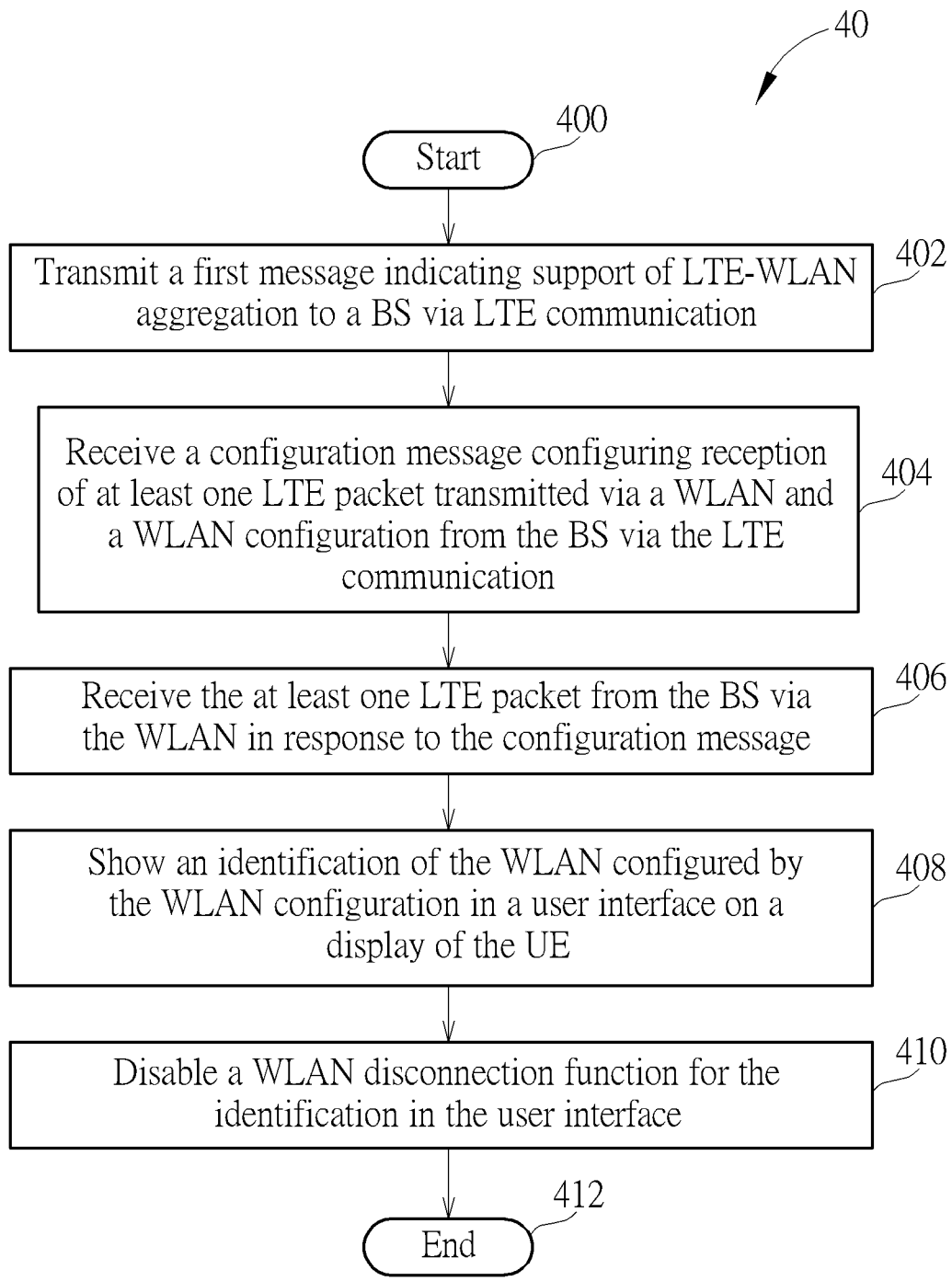
FIG. 4 is a flowchart of a process according to an example of the present invention.

FIG. 4 is a flowchart of a process 40 according to an example of the present invention. The process 40 may be utilized in a UE (e.g., the UE 100), for aggregating LTE and WLAN (e.g., WiFi). The process 40 maybe compiled into the program code 214 and includes the following steps:

Step 400: Start.

Step 402: Transmit a first message indicating support of LTE-WLAN aggregation to a BS via LTE communication.

Step 404: Receive a configuration message configuring reception of at least one LTE packet transmitted via a WLAN and a WLAN configuration from the BS via the LTE communication.

Step 406: Receive the at least one LTE packet from the BS via the WLAN in response to the configuration message.

Step 408: Show an identification of the WLAN configured by the WLAN configuration in a user interface on a display of the UE.

Step 410: Disable a WLAN disconnection function for the identification in the user interface.

Step 412: End.

According to the process 40, the UE may transmit a first message indicating support of LTE-WLAN aggregation to a BS (e.g., the BS 102) via LTE communication. Accordingly, the UE may receive a configuration message (e.g., RRCConnectionReconfiguration) configuring a reception of at least one LTE packet transmitted via a WLAN and a WLAN configuration from the BS via the LTE communication. In addition, the UE may receive the at least one LTE packet from the BS via the WLAN in response to the configuration message. Accordingly, the UE may show an identification of the WLAN configured by the WLAN configuration in a user interface on a display of the UE, and may disable a WLAN disconnection function (e.g., "forget network" or "modify network") for the identification in the user interface. That is, even though the identification is shown on the display, the WLAN disconnection function is disabled to prevent a user of the UE from using the WLAN disconnection function to disconnect the WLAN. Thus, the WLAN is not disconnected according to the user's decision. As a result, the situation that the BS continues transmitting LTE packet(s) to the UE via the WLAN disconnected by the UE is avoided, and resources for transmitting the LTE packet(s) are saved.

Realization of the process 40 is not limited to the above description.

In one example, the UE may enable the WLAN disconnection function of the communication device, when the UE releases the LTE-WLAN aggregation, when the UE does not receive the WLAN configuration or when the UE receives a WLAN measurement configuration for the WLAN. In one example, the identification may include a SSID of the WLAN, a BSSID of the WLAN, and/or a HESSID of the WLAN, for the UE to identify the WLAN. In one example, the at least one LTE packet may include at least one LTE PDCP PDU or at least one PDCP LTE SDU.

Figure 5:
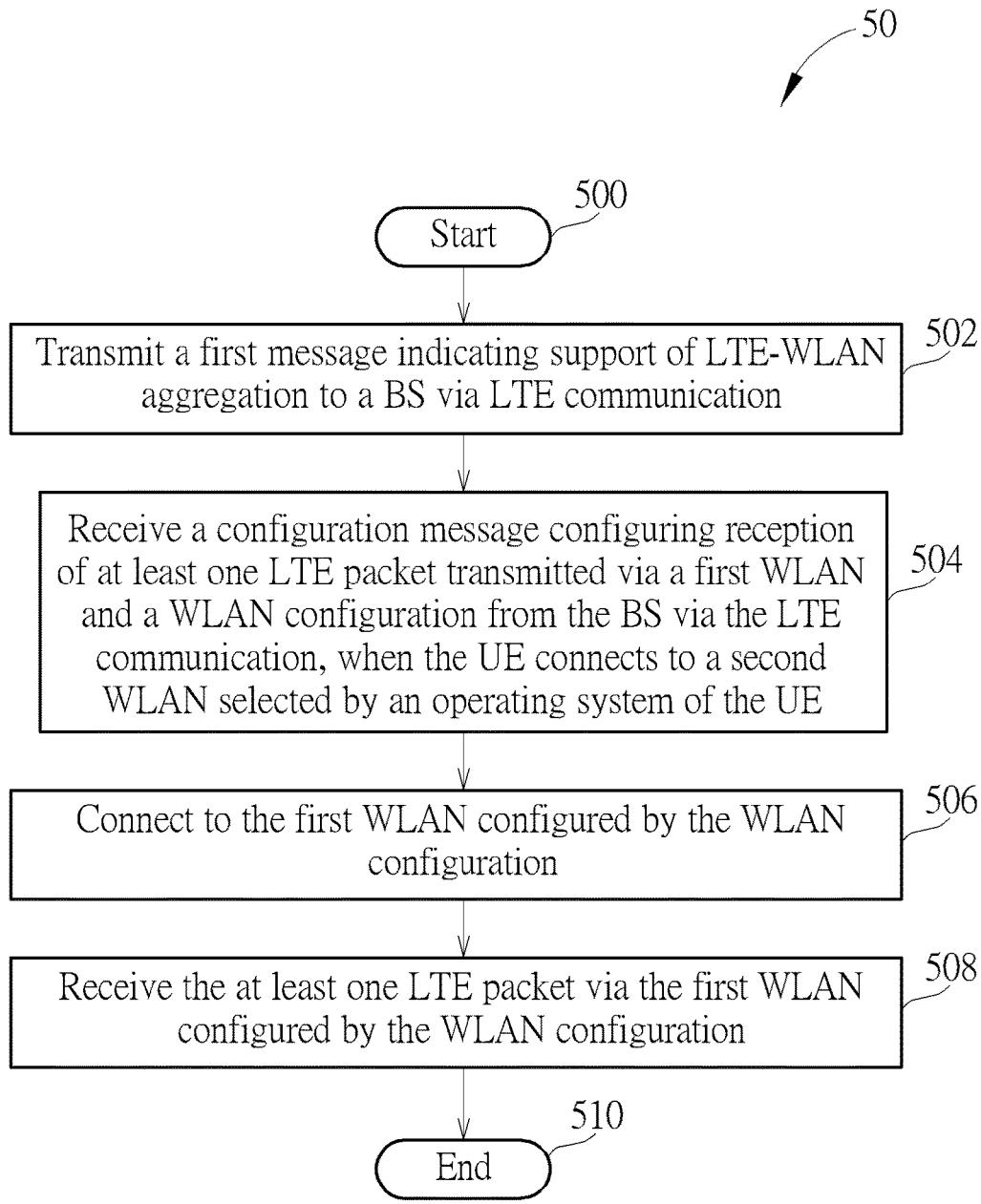
FIG. 5 is a flowchart of a process according to an example of the present invention.

FIG. 5 is a flowchart of a process 50 according to an example of the present invention. The process 50 maybe utilized in a UE (e.g., the UE 100), for aggregating LTE and WLAN (e.g., WiFi). The process 50 maybe compiled into the program code 214 and includes the following steps:

Step 500: Start.

Step 502: Transmit a first message indicating support of LTE-WLAN aggregation to a BS via LTE communication.

Step 504: Receive a configuration message configuring reception of at least one LTE packet transmitted via a first WLAN and a WLAN configuration from the BS via the LTE communication, when the UE connects to a second WLAN selected by an operating system of the UE.

Step 506: Connect to the first WLAN configured by the WLAN configuration.

Step 508: Receive the at least one LTE packet via the first WLAN configured by the WLAN configuration.

Step 510: End.

According to the process 50, the UE transmits a first message indicating support of LTE-WLAN aggregation to a BS (e.g., the BS 102) via LTE communication. Accordingly, the UE receives a configuration message (e.g., RRCConnectionReconfiguration) configuring reception of at least one LTE packet transmitted via a first WLAN and a WLAN configuration from the BS via the LTE communication, when the UE connects to a second WLAN selected by an operating system of the UE (e.g., selected by a user of the UE, or according to a predetermined rule in the operating system). The UE may connect to the first WLAN configured by the WLAN configuration. In this situation, the UE receive the at least one LTE packet via the first WLAN configured by the WLAN configuration. That is, a priority of the first WLAN configured by the WLAN configuration is higher than a priority of the second WLAN selected by the operating system. Thus, a conflict between the WLAN configuration and the user's decision is resolved. As a result, the UE and the BS can achieve a higher data rate according to the LTE-WALN aggregation.

Realization of the process 50 is not limited to the above description.

In one example, the UE may keep connecting to the second WLAN selected by the operating system. That is, even though the UE receives the at least one LTE packet via the first WLAN configured by the BS, the second WLAN is kept connected. The first WLAN and the second WLAN may be operated at different channels at carrier frequencies of 2.4 GHz or 5 GHz. In one example, the UE may disconnect the second WLAN in response to the WLAN configuration, e.g., if the UE is not capable of simultaneously connecting to both WLANs. In one example, the WLAN configuration includes an identification of the first WLAN. Further, the identification includes a SSID of the first WLAN, a BSSID of the first WLAN, and/or a HESSID of the first WLAN, for the UE to identify the first WLAN. In one example, the at least one LTE packet includes at least one LTE PDCP PDU or at least one PDCP LTE SDU.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a communication device and method for aggregating a LTE system and a WLAN. According to the present invention, the WLAN will is not disconnected according to the user's decision. As a result, the BS does not transmit LTE packet(s) to the UE via the WLAN which is disconnected by the UE, and resources for transmitting LTE packet (s) are saved. In addition, a conflict between the WLAN configuration and the user's decision can be resolved. As a result, the UE can receive the LTE packet(s) without any ambiguity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for aggregating long term evolution (LTE) and wireless local area network (WLAN), comprising:
    a storage device; and
    a processing circuit, coupled to the storage device, wherein the storage device stores, and the processing circuit is configured to execute instructions of:
    transmitting a first message indicating support of LTE-WLAN aggregation to a base station (BS) via LTE communication;
    receiving a configuration message configuring reception of at least one LTE packet transmitted via a WLAN and a WLAN configuration from the BS via the LTE communication, wherein the at least one LTE packet comprises at least one LTE packet data convergence protocol (PDCP) protocol data unit (PDU) or at least one LTE PDCP service data unit (SDU);
    receiving the at least one LTE packet from the BS via the WLAN in response to the configuration message; and
    not showing an identification of the WLAN configured by the WLAN configuration on a display of the communication device;
    wherein the identification comprises a service set identifier (SSID) of the WLAN, a basic service set identifier (BSSID) of the WLAN, or a homogenous extended service set identifier (HESSID) of the WLAN.

2. A communication device for aggregating long term evolution (LTE) and wireless local area network (WLAN), comprising:
    a storage device; and
    a processing circuit, coupled to the storage device, wherein the storage device stores, and the processing circuit is configured to execute instructions of:

transmitting a first message indicating support of LTE-WLAN aggregation to a base station (BS) via a LTE communication;
receiving a configuration message configuring reception of at least one LTE packet transmitted via a WLAN and a WLAN configuration from the BS via the LTE communication;
receiving the at least one LTE packet from the BS via the WLAN in response to the configuration message;
showing an identification of the WLAN configured by the WLAN configuration in a user interface on a display of the communication device, wherein the identification comprises a service set identifier (SSID) of the WLAN, a basic service set identifier (BSSID) of the WLAN, or a homogenous extended service set identifier (HESSID) of the WLAN;
disabling a WLAN disconnection function for the identification in the user interface; and
enabling the WLAN disconnection function of the communication device, when the communication device releases the LTE-WLAN aggregation, when the communication device does not receive the WLAN configuration or when the communication device receives a WLAN measurement configuration for the WLAN
wherein the at least one LTE packet comprises at least one LTE packet data convergence protocol (PDCP) protocol data unit (PDU) or at least one LTE PDCP service data unit (SDU).

3. A communication device for aggregating long term evolution (LTE) and wireless local area network (WLAN), comprising:

a storage device; and
a processing circuit, coupled to the storage device, wherein the storage device stores, and the processing circuit is configured to execute instructions of:
transmitting a first message indicating support of LTE-WLAN aggregation to a base station (BS) via a LTE communication;
receiving a configuration message configuring reception of at least one LTE packet transmitted via a first WLAN and a WLAN configuration from the BS via the LTE communication, when the communication device connects to a second WLAN selected by an operating system of the communication device, wherein the WLAN configuration includes an identification of the first WLAN, and the identification comprises a service set identifier (SSID) of the first WLAN, a basic service set identifier (BSSID) of the first WLAN, or a homogenous extended service set identifier (HESSID) of the first WLAN;
disconnecting from the second WLAN and connecting to the first WLAN configured by the WLAN configuration, in response to the WLAN configuration, wherein a priority of the first WLAN is higher than a priority of the second WLAN; and
receiving the at least one LTE packet via the first WLAN configured by the WLAN configuration;
wherein the at least one LTE packet comprises at least one LTE packet data convergence protocol (PDCP) protocol data unit (PDU) or at least one LTE PDCP service data unit (SDU).

* * * * *